United States Patent [19]
Girardeau, Jr.

[11] Patent Number: 5,487,024
[45] Date of Patent: Jan. 23, 1996

[54] DATA PROCESSING SYSTEM FOR HARDWARE IMPLEMENTATION OF SQUARE OPERATIONS AND METHOD THEREFOR

[75] Inventor: James W. Girardeau, Jr., Toulouse, France

[73] Assignee: Motorola, Inc., Schaumburg, Ill.

[21] Appl. No.: 152,075

[22] Filed: Nov. 15, 1993

Related U.S. Application Data

[63] Continuation of Ser. No. 677,919, Apr. 1, 1991, abandoned.

[51] Int. Cl.⁶ .................................................. G06F 7/552
[52] U.S. Cl. ...................... 364/753; 364/813; 364/258; 364/262; 364/DIG. 1; 327/349; 395/494
[58] Field of Search ............................. 395/400, 425; 364/753, 754, 759, 769, 813 MS; 327/349

[56] References Cited

U.S. PATENT DOCUMENTS

| | | | |
|---|---|---|---|
| 3,610,906 | 10/1971 | Stampler | 364/757 |
| 4,587,627 | 5/1986 | Omura et al. | 364/754 |
| 4,766,416 | 8/1988 | Noujaim | 341/138 |
| 4,787,056 | 11/1988 | Dieterich | 364/753 |
| 4,817,028 | 3/1989 | Masson et al. | 364/753 |
| 4,891,779 | 1/1990 | Hasebe | 364/754 |
| 4,939,688 | 7/1990 | Kitzen | 364/813 |
| 5,210,710 | 5/1993 | Omura | 364/746.1 |

OTHER PUBLICATIONS

"A Digital Signal Processor with IEEE Floating-Point Arithmetic" by Sohie, G. and Kloker, K., IEEE Micro, vol. 8, No. 6, Dec. 1988, pp. 49–67.

Primary Examiner—Eddie P. Chan
Assistant Examiner—J. Peikari
Attorney, Agent, or Firm—Paul J. Polansky

[57] ABSTRACT

A data processing system for performing square operations includes a data processor such as a digital signal processor (DSP) and a memory system. The DSP has two data paths for fetching two operands of an instruction from locations specified by two addresses, which may be required for an operation such as a multiply operation. A fetch from the second data path is delayed in response to a wait signal. The memory system includes at least two memory portions. Data from the two memory portions are multiplexed onto the two data paths in response to a first portion of the respective addresses. If the first portions of both addresses are equal, and if second portions are unequal, the wait signal is activated. If the second portions of the addresses are equal, such as during a square operation, the wait signal is inactive and data is simultaneously read by both data paths.

13 Claims, 4 Drawing Sheets

DATA PROCESSING SYSTEM FOR HARDWARE IMPLEMENTATION OF SQUARE OPERATIONS AND METHOD THEREFOR

This application is a continuation of prior application Ser. No. 07/677,919, filed Apr. 1, 1991, now abandoned.

FIELD OF THE INVENTION

This invention relates generally to data processing systems, and more particularly, to data processing systems having data processors with two or more data paths.

BACKGROUND OF THE INVENTION

Data processors known as digital signal processors (DSPs) have been used with increasing frequency in such applications as communications, control, instrumentation, and digital audio. A DSP is a special type of data processor which is designed to efficiently process a data stream in real time. One example is a fast fourier transform (FFT), in which a real-time signal is converted into a representation in the frequency domain for processing such as filtering. Once the filtering is accomplished, the signal is returned to the time domain. DSPs are computation-intensive data processors, and thus must be able to perform certain arithmetic operations efficiently.

One way to accomplish fast arithmetic manipulation of data is for the DSP to access two separate operands independently via two separate data paths. See, for example, "A Digital Signal Processor with IEEE Floating-Point Arithmetic" by Sohie, G. and Kloker, K., *IEEE Micro,* vol. 8, no. 6, December 1988, pp. 49–67. The data accessed through the two data paths may be in physically distinct memory systems, but more typically is located within the same memory system. A DSP may perform a multiply operation by fetching one operand through the first data path, and the other operand from the second data path. An assembly code mnemonic for such an operation may read "mpy (r0)*(r1)", where r0 and r1 are pointers to data to be accessed from the first and second data paths, respectively, as the two operands of the multiply operation.

Computational algorithms for digital signal processing often involve squaring of operands, that is, multiplying an operand by itself. To maximize the speed of the square operation, it is desirable to fetch one operand from each data path. The mnemonic for such an operation may read "mpy (r0)*(r0)", where r0 is the pointer to the operand to be squared. However, if the first and second data paths are implemented in the same physical memory, such an operation presents a problem. The square operation "mpy (r0)*(r0)" takes multiple cycles because the same data must be fetched twice out of the same memory location and provided to two different data paths.

BRIEF DESCRIPTION OF THE INVENTION

Accordingly, there is provided, in one form, a data processing system comprising a data processor, first and second memory portions, multiplex means, and logic means. The a data processor is coupled to first and second data paths and to first and second addresses corresponding thereto, respectively. Each of the first and second addresses have a first portion and a second portion. The data processor delays an access to the second data path in response to a wait signal being active. The multiplex means is coupled to the first and second memory portions and to the first and second data paths. The multiplex means multiplexes data from the first memory portion onto either the first or the second data path in response to the first portion of the first address, and from the second memory portion onto either the first or the second data path in response to the first portion of the second address. The logic means is coupled to the data processor, and activates the wait signal if both, the first portion of the first address and the first portion of the second address are equal, and, the second portion of the first address and the second portion of said second address are unequal. The logic means keeps the wait signal inactive if the first portion of the first address and the first portion of the second address are equal and the second portion of the first address and the second portion of the second address are equal.

These and other objects, features and advantages will be more clearly understood from the following detailed description taken in conjunction with the accompanying drawings.

DETAILED DESCRIPTION OF THE INVENTION

Figure 1:
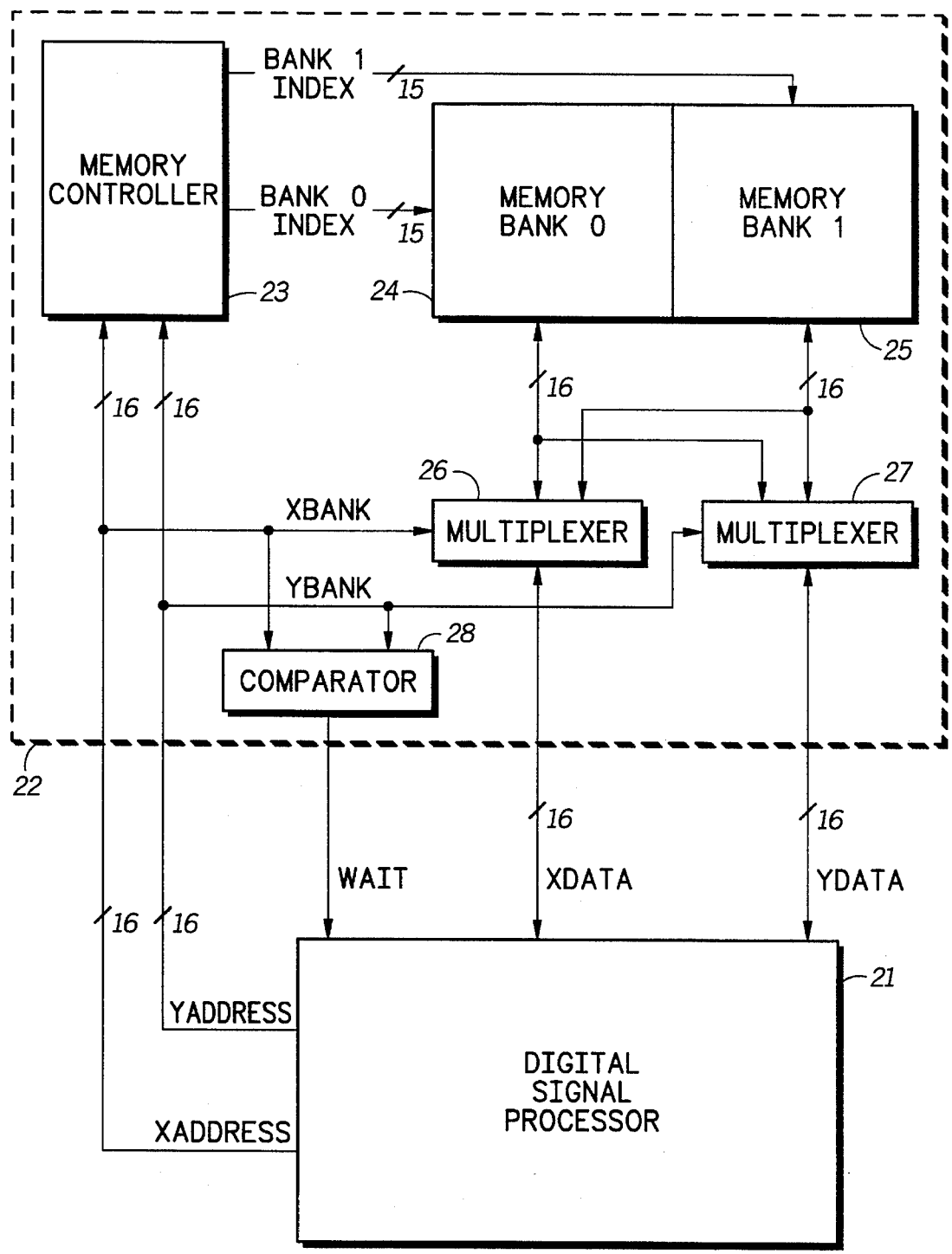
FIG. 1 illustrates in block form a data processing system with a data processor having two data paths.

FIG. 1 illustrates in block form a data processing system 20 with a data processor having two data paths. Data processing system 20 includes generally a digital signal processor 21, and a memory system 22. More particularly, memory system 22 includes a memory controller 23, a first memory portion 24 labelled "MEMORY BANK 0", a second memory portion 25 labelled "MEMORY BANK 1", a multiplexer 26, a multiplexer 27, and a comparator 28. Digital signal processor 21 has two data paths, one data path conducting 16 bidirectional data signals labelled "XDATA", and another data path conducting 16 bidirectional data signals labelled "YDATA". Digital signal processor 21 provides two addresses labelled "XADDRESS" and "YADDRESS" to access data in memory system 22. XADDRESS has a highest-ordered bit labelled "XBANK", with the remaining bit positions designated "XINDEX". YADDRESS has a highest-ordered bit labelled "YBANK", with the remaining bit positions designated "YINDEX". In the illustrated embodiment, both XDATA and YDATA are 16-bit, general purpose, bidirectional data paths. In another embodiments, either or both data paths may be read-only. It should also be apparent that the present invention is applicable also to different address and data bus sizes.

Memory controller 23 receives both XADDRESS and YADDRESS, and provides a plurality of address signals labelled "BANK 0 INDEX" to first memory portion 24, and a plurality of address signals labelled "BANK 1 INDEX" to second memory portion 25. Memory portions 24 and 25 each couple sixteen bidirectional data signal lines to both multiplexer 26 and multiplexer 27. Multiplexer 26 is coupled to both memory portion 24 and memory portion 25, receives address signal XBANK from digital signal processor 21, and is coupled to the XDATA path. Multiplexer 27 is coupled to both memory portion 24 and memory portion 25, receives address signal YBANK from digital signal processor 21, and is coupled to the YDATA path. Comparator 28 receives both address signals XBANK and YBANK, and provides a signal labelled "WAIT" to digital signal processor 21. It should be apparent that various timing and control signals are omitted from this illustration of data processing system 20, but the timing and function of such control signals are known in the art and are not essential in understanding the present invention.

In data processing system 20, digital signal processor 21 is a conventional digital signal processor which accesses data through two separate data paths, accessed by two addresses. The first address, XADDRESS, includes high-order address bit XBANK to select whether memory portion 24 or 25 is coupled to the XDATA path. The remaining bits of XADDRESS provide an index into memory portion selected by XBANK. The second address, YADDRESS, includes high-order address bit YBANK to select whether memory portion 24 or 25 is coupled to the YDATA path. The remaining bits of YADDRESS provide an index into the memory portion selected by YBANK. During a memory access, digital signal processor 21 may simultaneously accesses data from both the XDATA and YDATA paths if an instruction being executed so specifies. Having two data paths improves the performance of digital signal processor 21 over a single data path, especially for computation-intensive applications such as real-time signal processing. In other embodiments, digital signal processor 21 may be a general purpose or integer data processor, although dual data paths are especially suited to DSP systems.

Ideally, accesses to the XDATA and YDATA paths may occur simultaneously, without delay. Memory system 22 has two portions, 24 and 25, to more easily avoid delay. If all the operands accessed via the XDATA path are located in one portion, and all operands accessed via the YDATA path are located in the other portion, then each operation may proceed without delay, providing two operands of data to digital signal processor 21 in one memory access cycle. If XBANK and YBANK are the same, indicating that data to be accessed via both data paths is present in the same memory portion, then a collision occurs. Comparator 28 detects the collision and activates WAIT to digital signal processor 21. If a collision occurs and WAIT is activated, then the memory fetches must be done sequentially, taking two cycles to provide data to digital signal processor 21.

For example, assume during an read access, operands are requested via both the XDATA and YDATA paths, and both XADDRESS and YADDRESS are within the address space of memory portion 24. Memory controller 23 recognizes the collision by examining XBANK and YBANK. In a first cycle, memory controller 23 provides BANK 0 INDEX to memory portion 24 in response to the lower fifteen bits of XADDRESS, and the contents of the accessed location are passed through multiplexer 26 as XDATA. Comparator 28 also recognizes the collision by comparing XBANK and YBANK, and activates signal WAIT in response. Although YBANK also causes multiplexer 27 to couple data from memory portion 24 accessed by XADDRESS to the YDATA path, digital signal processor 21 receives signal WAIT, and reads only the first operand via the XDATA path. In the second cycle, memory controller 23 provides BANK 0 INDEX to memory portion 24 in response to YADDRESS, and the contents of the accessed location are passed through multiplexer 27 as YDATA. Comparator 28 deactivates signal WAIT to indicate to digital signal processor 21 that the second operand may be received on the YDATA path. Although XBANK also causes multiplexer 26 to couple data from memory portion 24 accessed by YADDRESS to the XDATA path during the second cycle, digital signal processor senses the negation of signal WAIT and reads only the second operand via the YDATA path.

Figure 2:
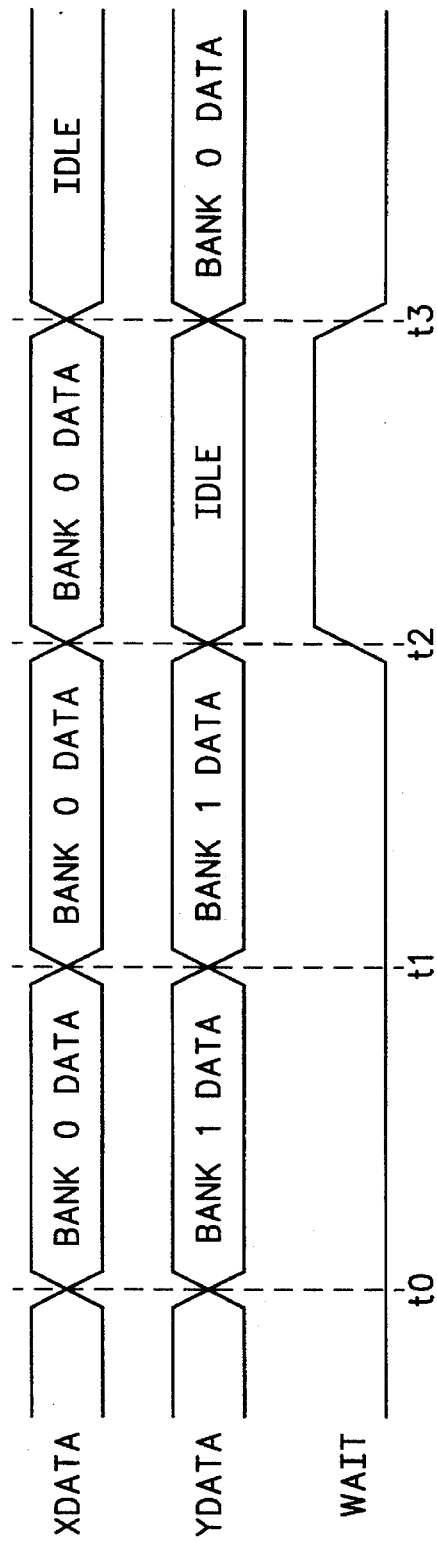
FIG. 2 illustrates a timing diagram of signals pertinent to the data processing system of FIG. 1.

If a square operation, such as "mpy (r0)*(r0)" occurs, the first and second addresses, located in an internal register labelled "r0", are equal. Consequently, both the first portion (XBANK and YBANK) and the second portion (the lower 15 bits) of XADDRESS and YADDRESS are equal. Comparator 28 detects a collision and activates signal WAIT. Digital signal processor 21 fetches the XDATA operand during the first cycle, and the YDATA operand during the second cycle. Referring now to FIG. 2, which illustrates a timing diagram of signals pertinent to the data processing system of FIG. 1, a typical access takes place at time t0. In this access, which may be "mpy (r0)*(r1)", memory portion 24 provides data labelled "BANK0 DATA" addressed by XADDRESS to the XDATA path, and memory portion 25 provides data labelled "BANK1 DATA" addressed by YADDRESS to the YDATA path, where r0 is a pointer to a memory location in MEMORY BANK 0, and r1 is a pointer to a memory location in MEMORY BANK 1. Note that BANK0 DATA and BANK1 DATA do not represent a data element from a single memory location, but rather some data element from memory portion 24 and memory portion 25, respectively. Data is provided to both data paths and the instruction mpy(r0)*(r1) is completed in one memory access cycle, which is the time between t0 and a time labelled "t1". A subsequent access occurs between t1 and a time labelled "t2", during which BANK0 DATA is addressed by XADDRESS on the XDATA path and BANK1 DATA is addressed by YADDRESS on the YDATA path. Thus, data processing system 20 provides an efficient system to access data via two data paths for real-time DSP operation.

However, if a square operation occurs, represented by the mnemonic "mpy (r0)*(r0)", a single operand from BANK0 DATA addressed by XADDRESS is to be accessed by both the XDATA and YDATA paths. A collision occurs, and comparator 28 activates signal WAIT. During the first cycle, between t2 and a time labelled "t3", BANK0 DATA addressed by XADDRESS is provided to the XDATA path. Although BANK 0 DATA addressed by XADDRESS is present on the YDATA path, since signal WAIT is active, the YDATA path is idle. In the subsequent cycle, after time t3, signal WAIT is inactive, and although BANK 0 DATA addressed by YADDRESS is present on the XDATA path, the XDATA path is idle, and the YDATA path receives BANK0 DATA. Thus, in data processing system 20, a square operation requires two memory access cycles, and bandwidth from each data path is wasted.

Figure 3:
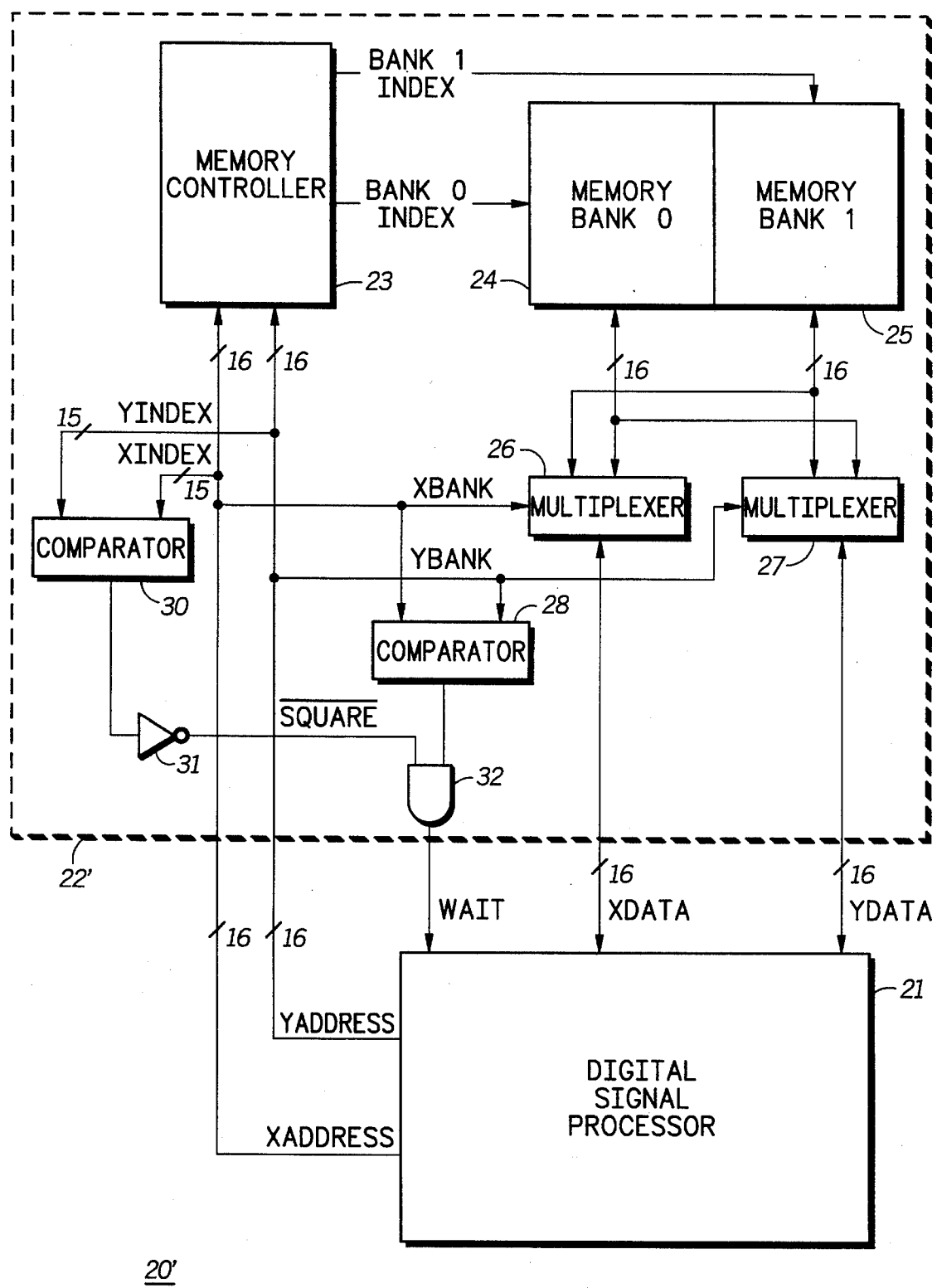
FIG. 3 illustrates in block form a data processing system in accordance with the present invention.

FIG. 3 illustrates in block form a data processing system 20' in accordance with the present invention. Data processing system 20' has some elements in common with data processing system 20 of FIG. 1, and the common elements are similarly numbered. Memory system 22' additionally includes a comparator 30, an inverter 31, and an AND gate 32. Comparator 30 has a first set of input terminals for receiving the fifteen XINDEX signals, a second set of input terminals for receiving the fifteen YINDEX signals, and an output terminal. Inverter 31 has an input terminal coupled to the output terminal of comparator 30, and an output terminal for providing a signal labelled $\overline{SQUARE}$. $\overline{SQUARE}$ is an active low signal indicating that a square operation is in progress. AND gate 32 has a first input terminal for receiving $\overline{\text{SQUARE}}$, a second input terminal connected to the output terminal of comparator 28, and an output terminal providing signal WAIT to digital signal processor 21.

If an operation is in progress in which accesses from both data paths are sought in a single memory portion, but to different addresses, it is of course necessary to provide the data in sequential cycles (as previously illustrated between t2 and t3 in FIG. 2). The output terminal of comparator 28 is active at a logic high to indicate that XBANK and YBANK are equal. Since XINDEX and YINDEX are not equal, $\overline{\text{SQUARE}}$ is inactive at a logic high, and thus WAIT is active. If a square operation is in progress, indicated by the mnemonic "mpy (r0)*(r0)", digital signal processor 21 attempts to access the same memory location on both the XDATA and YDATA paths. Thus, both XBANK and YBANK are equal, and XINDEX and YINDEX are equal. The output of comparator 28 is a logic high, and signal $\overline{\text{SQUARE}}$ is active at a logic low. Thus, signal WAIT remains inactive. If r0 is a pointer to MEMORY BANK 0, then the sixteen bits of data provided by MEMORY BANK 0 are coupled to both the XDATA and YDATA paths, and digital signal processor 21 reads operands from both the XDATA and YDATA paths within a single memory access cycle. On the other hand if r0 is a pointer to MEMORY BANK 1, then the sixteen bits of data provided by MEMORY BANK 1 are coupled to both the XDATA and YDATA paths, and digital signal processor 21 reads operands from both the XDATA and YDATA paths within a single memory access cycle.

Figure 4:
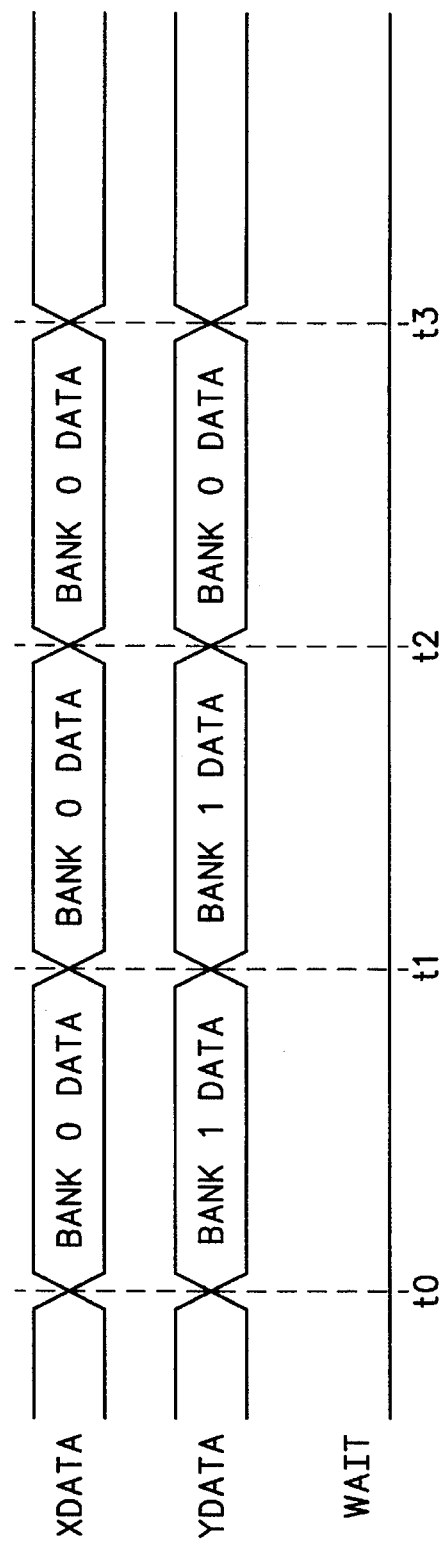
FIG. 4 illustrates a timing diagram of signals pertinent to the data processing system of FIG. 3.

FIG. 4 illustrates a timing diagram of signals pertinent to data processing system 20' of FIG. 3. Time points are similarly numbered as corresponding time points in FIG. 2. Between times t0 and t1, and t1 and t2, digital signal processor 21 accesses BANK0 DATA addressed by XADDRESS and BANK1 DATA addressed by YADDRESS on the XDATA and YDATA paths, respectively. However, digital signal processor 21 attempts to execute a square operation at time t2. Since signal WAIT is now kept inactive when comparator 30 detects XADDRESS and YADDRESS being equal, the data element of the square operation is now simultaneously read on both the XDATA and YDATA paths. Thus, data processing system 20' has improved performance in relation to data processing system 20 illustrated in FIG. 1. The amount of performance improvement depends on the application, but as the proportion of square operations to the number of total operations increases, the percentage performance improvement increases. The performance improvement is larger for computation-intensive applications such as digital signal processing.

Referring again to FIG. 3, it can be seen that there are at least six advantages with data processing system 20'. First, the lost bus bandwidth during the square operation is recovered, resulting in improved system performance. The amount of improvement depends, of course, on the types of instructions being performed by digital signal processor 21. However, the improvement is greater for more computation-intensive applications. Also, the overall power consumption expended in performing the multiply instruction is reduced because, for example, power consumed by multiplexer 27 providing the unused data element between times t2 and t3, in which the YDATA path is idle, is saved. Second, data processing system 20' adds only a small amount of extra circuitry, which can be easily added to integrated circuits or computer-board logic. Third, the delay through comparator 30, inverter 31, and AND gate 32 is less than the time it takes for either memory portion 24 or memory portion 25 to provide data to either the XDATA or the YDATA path, and thus the additional circuitry does not slow the memory access cycle. Fourth, the invention is transparent to a programmer of digital signal processor 21, because a special instruction to perform a square operation is not required. Fifth, the extra circuitry of data processing system 20' improves the operation of instructions other than the square instruction, such as an add instruction of the same operand to achieve a quick multiply by two. Sixth, existing software programs will run unchanged using the improved memory architecture, but will execute faster. Thus, the improvement offered by memory system 22' over memory system 22 of FIG. 2 is transparent to the programmer.

Figure 5:
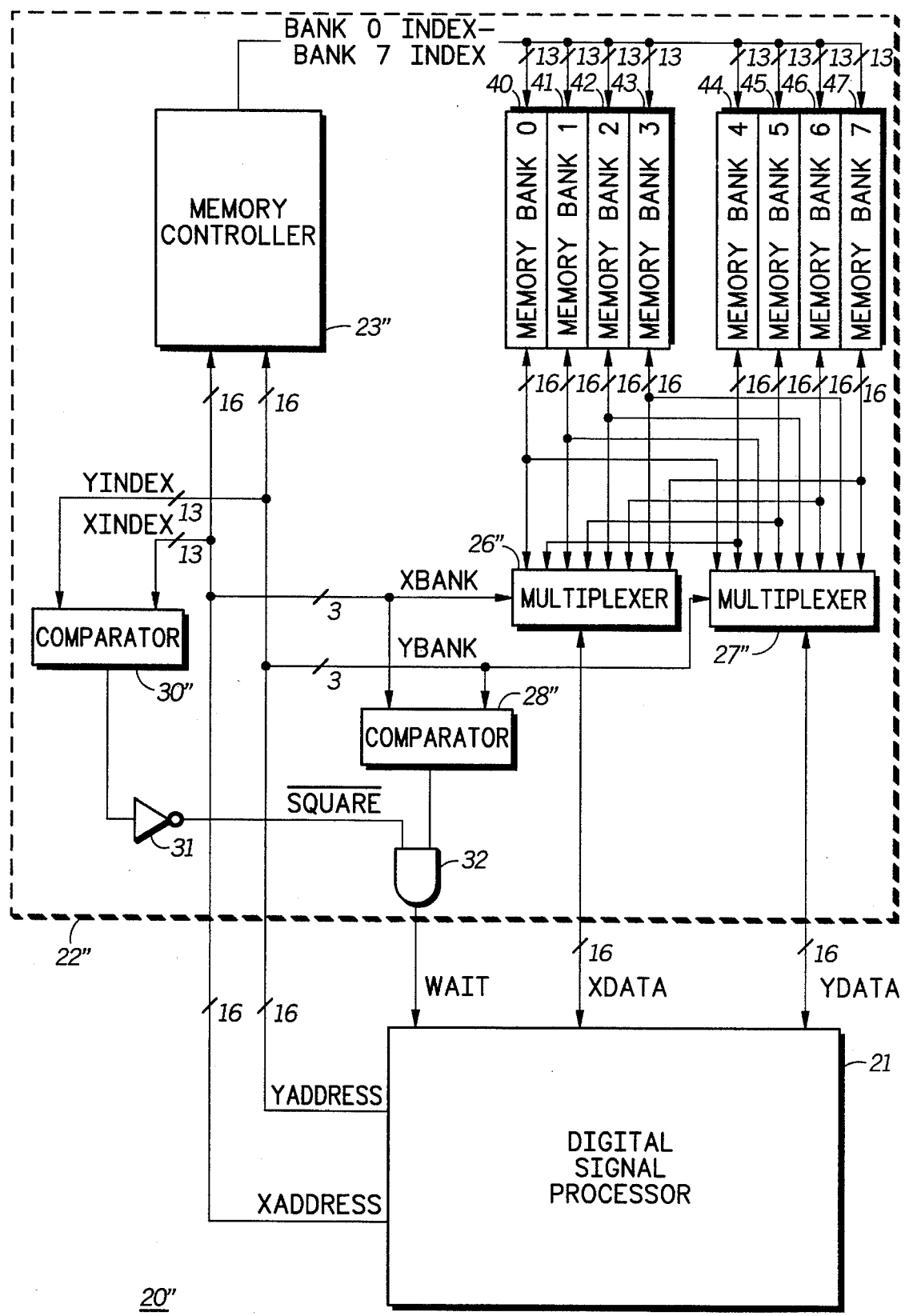
FIG. 5 illustrates a data processing system in accordance with a preferred embodiment of the present invention.

FIG. 5 illustrates a data processing system 20" in accordance with a preferred embodiment of the present invention. Data processing system 20" has some elements in common with data processing system 20' of FIG. 3, and the common elements are similarly numbered. In data processing system 20", memory system 22" includes eight memory portions 40–47, each receiving an index address from memory controller 23". In data processing system 20", XBANK and YBANK are three high-order bits to select one-of-eight memory portions. XINDEX and YINDEX are 13-bit indexes into operands for the XDATA and YDATA paths, respectively. Consequently, comparator 30" performs a comparison on 13-bit input numbers; comparator 28" performs a comparison on 3-bit input numbers; and multiplexers 26" and 27" receive the 3-bit XBANK and YBANK to select one-of-eight memory portions to couple to the XDATA and YDATA paths, respectively. Comparing FIG. 5 to FIG. 1, it is seen that arbitrary numbers of memory portions may be included in the memory system, with a minimum of two. The number of memory portions included may be affected by how a compiler of machine code for digital signal processor 21 segments operands for the program running on digital signal processor 21. It is desirable for system performance to have the operands fetched from the XDATA and YDATA paths to be stored in separate memory portions as often as possible to avoid collisions which decrease performance. However, data processing system 20" improves performance over data processing system 20 by eliminating the penalty of having the same operand fetched twice from the same memory portion for two separate data paths.

It should be apparent that the present invention applies equally to other instructions which fetch the same operand via two separate data paths. While bidirectional read/write data paths were illustrated, the invention applies as well to one or two read-only data paths. It should also be apparent that the invention applies to arbitrary numbers of data paths. For example, if three data paths are provided, an operation taking an operand to the third power represented by the mnemonic "mpy(r0)*(r0)*(r0)" could be recognized by keeping signal WAIT inactive if three addresses are equal.

While the invention has been described in the context of a preferred embodiment, it will be apparent to those skilled in the art that the present invention may be modified in numerous ways and may assume many embodiments other than that specifically set out and described above. For example, the number of memory portions in the memory system may be increased to decrease the likelihood that digital signal processor 21 will access the same portion on both data paths and WAIT must be activated. In that case, the number of signals in XBANK and YBANK is increased. Also, a data processor which has two data paths but which performs a function other than digital signal processing is also possible. Accordingly, it is intended by the appended claims to cover all modifications of the invention which fall within the true spirit and scope of the invention.

I claim:

1. A data processing system comprising:

a data processor coupled to first and second data paths and to first and second addresses corresponding thereto, respectively, each of said first and second addresses having a first portion and a second portion, said data processor delaying an access to said second data path in response to a wait signal being active;

first and second memory portions;

multiplex means coupled to said first and second memory portions and to said first and second data paths, for multiplexing data from said first memory portion onto either said first or said second data path in response to said first portion of said first address, and from said second memory portion onto either said first or said second data path in response to said first portion of said second address; and logic means coupled to said data processor, for activating said wait signal if both, said first portion of said first address and said first portion of said second address are equal, and, said second portion of said first address and said second portion of said second address are unequal, and for keeping said wait signal inactive if, said first portion of said first address and said first portion of said second address are equal and said second portion of said first address and said second portion of said second address are equal.

2. The data processing system of claim 1 wherein said data processor is a digital signal processor.

3. The data processing system of claim 2 wherein said logic means comprises:

first comparator means, for activating a first signal if said first portions of said first and second addresses are equal;

second comparator means, for activating a second signal if said second portions of said first and second addresses are not equal; and AND gate means, for providing said wait signal in response to an activation of said first and second signals.

4. The data processing system of claim 1 wherein said logic means activates said wait signal only if both, said first portion of said first address and said first portion of said second address are equal, and, said second portion of said first address and said second portion of said second address are unequal.

5. The data processing system of claim 1 wherein said data processor accesses said first memory portion via said first data path when said first portion of said first address is in a first state, accesses said second memory portion via said first data path when said first portion of said first address is in a second state, accesses said first memory portion via said second data path when said first portion of said second address is in said first state, and accesses said second memory portion via said second data path when said first portion of said second address is in said second state.

6. A memory system for use with at least one information requesting device comprising:

first and second memory portions;

a controller for receiving first and second input addresses and for providing first and second memory addresses to said first and second memory portions, respectively, in response, each of said first and second input addresses having a first portion and a second portion;

multiplex means coupled to said first and second memory portions, for multiplexing data from said first memory portion onto either said first or said second data path in response to said first portion of said first input address, and from said second memory portion onto either said first or said second data path in response to said first portion of said second input address; and logic means, for activating a wait signal which causes said at least one information requesting device to delay an access to said second data path if both, said first portion of said first input address and said first portion of said second input address are equal, and, said second portion of said first input address and said second portion of said second input address are not equal, and for keeping said wait signal inactive if, said first portion of said first address and said first portion of said second address are equal and said second portion of said first address and said second portion of said second address are equal.

7. The memory system of claim 6 wherein said logic means comprises:

first comparator means, for activating a first signal if said first portions of said first and second input addresses are equal;

second comparator means, for activating a second signal if said second portions of said first and second input addresses are not equal; and AND gate means, for providing said wait signal in response to an activation of said first and second signals.

8. The memory system of claim 7 wherein said first portions of said first and second input addresses are of a higher order than said second portions of said first and second input addresses, respectively.

9. In a data processing system including a memory system and a data processor, the data processor coupled to first and second data paths and first and second addresses corresponding thereto, respectively, the memory system comprising:

first and second memory portions;

multiplex means coupled to said first and second memory portions, for multiplexing data from said first memory portion onto either said first or said second data path in response to a first portion of the first address, and from said second memory portion onto either said first or said second data path in response to a first portion of the second address; and logic means coupled to said multiplex means and to the data processor, for activating a wait signal which causes said data processor to delay an access to said second data path if both, said first portion of the first address and said first portion of the second address are equal, and, a second portion of the first address and a second portion of the second address are unequal, and for keeping said wait signal inactive if, said first portion of said first address and said first portion of said second address are equal and said second portion of said first address and said second portion of said second address are equal.

10. The memory system of claim 9 wherein said logic means comprises:

a first comparator for providing a first signal in a first predetermined logic state if said first portion of the first address and said first portion of the second address are equal;

a second comparator for providing a second signal in a second predetermined logic state if said second portion of the first address and said second portion of the second address are not equal; and AND gate means coupled to said first and second comparators and to the data processor, for providing said wait signal in response to both said first signal being in said first predetermined logic state and said second signal being in said second predetermined state.

11. A data processing system comprising:

a data processor coupled to first and second data paths and first and second addresses corresponding thereto, respectively, each of said first and second addresses having a first portion and a second portion, said data processor delaying an access to said second data path in response to a wait signal being active;

first and second memory portions;

a first multiplexer coupled to said first and second memory portions and to said first data path, for coupling either said first or said second memory portion to said first data path in response to said first portion of said first address being in first or second states thereof, respectively;

a second multiplexer coupled to said first and second memory portions and to said second data path, for coupling either said first or said second memory portion to said second data path in response to said first portion of said second address being in first or second states thereof, respectively;

control means coupled to said data processor, for providing a first memory address to either said first memory portion if said first portion of said first address is in said first state, or to said second memory portion if said first portion of said first address in said second state, and for providing a second memory address to either said first memory portion if said first portion of said second address is in said first state, or to said second memory portion if said first portion of said second address in said second state; and logic means coupled to said data processor, for activating said wait signal if both, said first portions of said first and second addresses are equal, and said second portions of said first and second addresses are unequal, and for keeping said wait signal inactive if, said first portion of said first address and said first portion of said second address are equal and said second portion of said first address and said second portion of said second address are equal.

12. The data processing system of claim 11 wherein said logic means comprises:

a first comparator for providing a first signal in response to said first portions of said first and second addresses being equal;

a second comparator for providing a second signal in response to said second portions of said first and second addresses being unequal;

an AND gate having first and second inputs respectively receiving said first and second signals, and an output for providing said wait signal.

13. A method of improving performance of a data processing system comprising the steps of:

providing first and second addresses each having first and second portions for accessing data via first and second data paths, respectively, in response to a plurality of instructions;

accessing first and second data elements respectively in response to said first and second addresses, said first data element accessed from either a first memory portion or a second memory portion in response to said first portion of said first address, said second data element accessed from either said first memory portion or said second memory portion in response to said first portion of said second address;

multiplexing data from one of said first and second memory portions selected in response to said first portion of said first address, onto said first data path;

multiplexing data from one of said first and second memory portions selected in response to said first portion of said second address, onto said second data path; and either, reading said first data element via said first data path and said second data element via said second data path if said first portion of said first and second addresses are not equal, or reading said first data element via said first data path during a first memory cycle and said second data element via said second data path during a second memory cycle if said first portion of said first and second addresses are equal and a second portion of said first and second addresses are not equal, or reading said first data element via said first and second data paths during said first memory cycle if both, said first portions of said first and second addresses are equal, and said second portions of said first and second addresses are equal.

* * * * *

UNITED STATES PATENT AND TRADEMARK OFFICE
CERTIFICATE OF CORRECTION

PATENT NO. : 5,487,024
DATED : January 23, 1996
INVENTOR(S) : James W. Girardeau, Jr.

It is certified that error appears in the above-indentified patent and that said Letters Patent is hereby corrected as shown below:

Column 8, line 60, change "providing" to --activating--.

Signed and Sealed this

Twenty-second Day of April, 1997

Attest:

BRUCE LEHMAN

*Commissioner of Patents and Trademarks*

*Attesting Officer*